United States Patent
Van Brocklin et al.

(10) Patent No.: US 8,262,201 B2
(45) Date of Patent: Sep. 11, 2012

(54) MICRO WRITING AND READING

(75) Inventors: Andrew L. Van Brocklin, Corvallis, OR (US); Kuohua (Angus) Wu, Corvallis, OR (US); Alok Sharan, Corvallis, OR (US); Vladek Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1554 days.

(21) Appl. No.: 11/733,552

(22) Filed: Apr. 10, 2007

(65) Prior Publication Data

US 2008/0252690 A1 Oct. 16, 2008

(51) Int. Cl.
*B41J 2/14* (2006.01)
*B41J 2/16* (2006.01)
*B41J 2/47* (2006.01)
*B41J 15/14* (2006.01)
*B41J 27/00* (2006.01)

(52) U.S. Cl. ............ 347/51; 347/225; 347/241

(58) Field of Classification Search ............ None
See application file for complete search history.

(56) References Cited

U.S. PATENT DOCUMENTS 6,839,524 B2 * 1/2005 Yamaguchi et al. ............ 399/2

OTHER PUBLICATIONS

R. Stewart, L.Li, D. Thomas: Multipass laser ablation of three coloured ink from a paper substrate; Journal of Materials Processing Technology 114 (2001) 161-167.

* cited by examiner

*Primary Examiner* — Matthew Luu
*Assistant Examiner* — Renee I Wilson

(57) ABSTRACT

In one embodiment, a printing device includes: a print engine configured to apply marking material to print media; a laser writer configured to expose the print media to a laser beam of sufficient energy to change the reflectivity of exposed portions of the print media; a media path along which the print engine may apply marking material to print media in a macro printing zone and along which the print media may be exposed to a beam of light emitted by the laser writer in a micro printing zone; and an electronic controller operatively connected to the print engine for selectively applying marking material to the print media and to the laser writer for selectively exposing the print media to a laser beam.

11 Claims, 11 Drawing Sheets

MICRO WRITING AND READING

BACKGROUND

It is sometimes desirable to create markings on documents that cannot be seen by a human user but that may be read by a machine. Lasers are used to write and read microscopic markings on optical data storage disks, commonly known as CDs and DVDs for example. In some CD writers, a layer of laser absorbing dye on the CD is exposed to a controlled pulsing laser light to write data on to the CD. The heat generated when the dye absorbs the laser light darkens the dye at each of the locations exposed to the laser light, changing the reflectivity of the CD at those locations. A reading laser in a CD player detects the pattern of changing reflectivity to "read" the data "written" on the CD. It would be advantageous, therefore, to be able to "print" microscopic markings on paper documents and read such markings from those documents in much the same way that microscopic data is written to and read from a CD.

DRAWINGS

DETAILED DESCRIPTION

Embodiments of the invention were conceived as part of an effort to develop micro printing techniques that could be implemented in inkjet and other digital printing technologies. Embodiments of the invention will be described with reference to inkjet printers and inkjet type multi-function printing devices (MFPs). The invention, however, is not limited to inkjet printing devices but may be embodied in any suitable printing technology.

As used in this document, "laser" means a device for generating a beam of coherent light; "lamp" means a source of incoherent light; and "burn" or "burning" includes physically removing material (ablation, for example), changing the physical state and optical/reflective properties of the material without changing the chemical state of the material (crystalline to amorphous phase transition, for example), and/or changing the chemical state of the material through radiation (photo or thermally induced degradation of the material).

Inkjet Printer with Laser Writer

Figure 1:
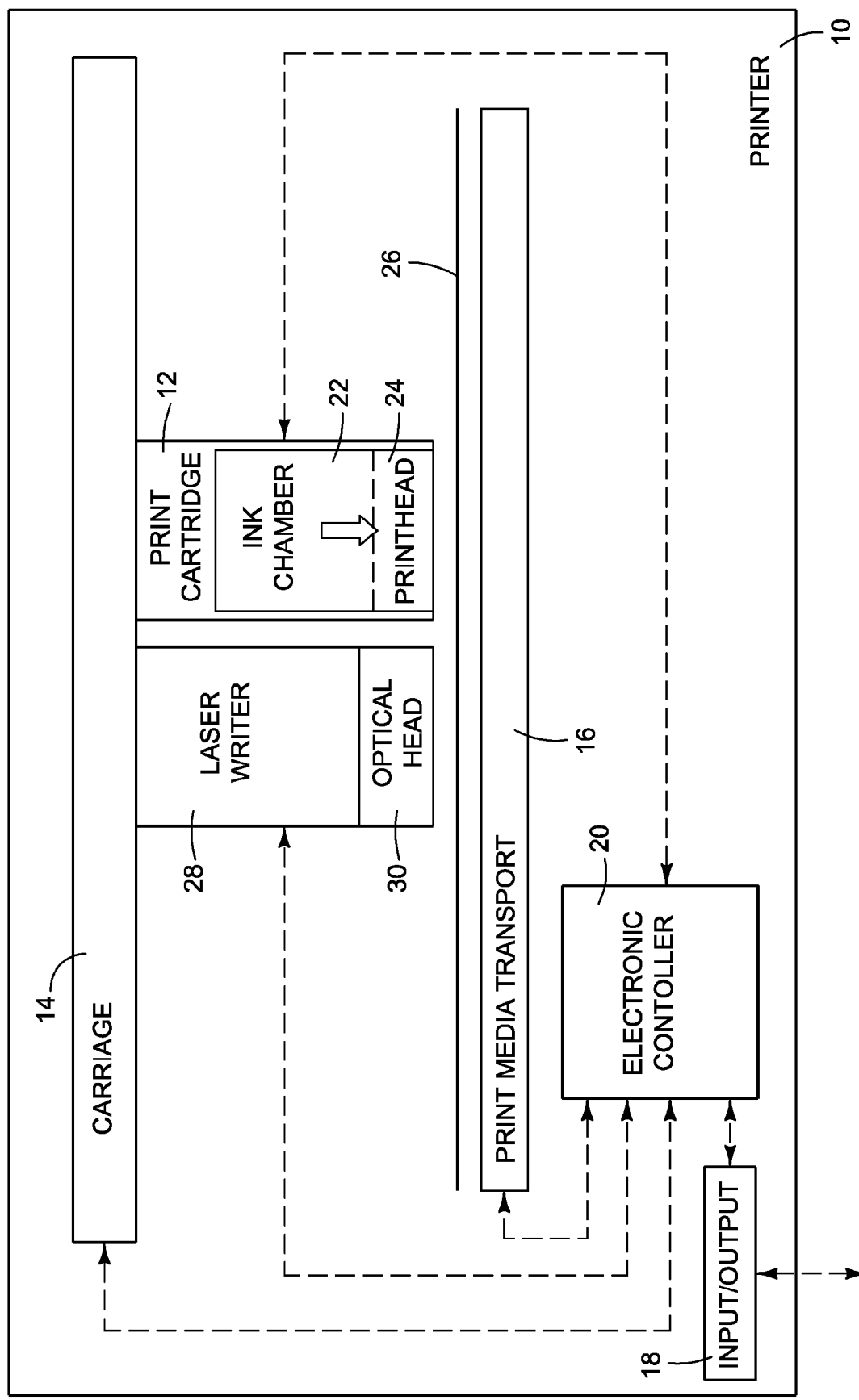
FIG. 1 is a block diagram illustrating an inkjet printer that includes a laser writer, according to one embodiment of the invention.

The block diagram of FIG. 1 illustrates a printer 10 that includes a print cartridge 12, a carriage 14, a print media transport mechanism 16, an input/output device 18, and an electronic printer controller 20 connected to each of the operative components of printer 10. Print cartridge 12 includes one or more ink holding chambers 22 and a printhead 24. Printhead 24 represents generally a small electromechanical part that contains an array of miniature thermal resistors, piezoelectric or other devices that are energized or activated to eject small droplets of ink out of an associated array of nozzles. A typical thermal inkjet printhead includes a nozzle plate arrayed with ink ejection nozzles and firing resistors formed on an integrated circuit chip positioned behind the ink ejection nozzles. The ink ejection nozzles are usually arrayed in columns along the nozzle plate. In operation, when printer controller 20 selectively energizes a firing resistor in the printhead, a vapor bubble forms in the ink vaporization chamber, ejecting a drop of ink through a nozzle on to the print media 26. In a piezoelectric printhead, piezoelectric elements are used to eject ink from a nozzle instead of firing resistors. Piezoelectric elements located close to the nozzles are caused to deform very rapidly to eject ink through the nozzles.

Print cartridge 12 may include a series of stationary cartridges or printheads that span the width of print media 26. Alternatively, cartridge 12 may include one or more cartridges that scan back and forth on a movable carriage 14 across the width of media 26. Other cartridge or printhead configurations are possible. A movable carriage 14 may include a holder for cartridge 12, a guide along which the holder moves, a drive motor, and a belt and pulley system that moves the holder along the guide. Media transport 16 advances print media 26 lengthwise past cartridge 12 and printhead 24. For a stationary cartridge 12, media transport 16 may advance media 26 continuously past printhead 12. For a scanning cartridge 12, media transport 16 may advance media 26 incrementally past printhead 24, stopping as each swath is printed and then advancing media 26 for printing the next swath.

Printer 10 also includes a laser writer 28 supported on carriage 14 and operatively connected to controller 20. Laser writer 28 represents generally any suitable laser and related optics for marking paper or other print media as described below. The laser marking assembly in optical disk drives compatible with the Hewlett-Packard Company LightScribe laser marking label media may be adapted for use as a laser writer 28. Although laser writer 28 may include one or more stationary optical heads 30 that span the width of print media 26, it is expected that laser writer 28 will usually include a single optical head 30 that scans back and forth on a movable carriage 14 across some of all of the width of media 26. Other configurations for laser writer 28 are possible.

Controller 20 communicates with external devices through input/output device 18, including receiving data for inkjet imaging and for micro print laser imaging. The presence of an input/output device 18, however, does not preclude the operation of printer 10 as a stand alone unit, with regard to either inkjet imaging or laser imaging. Controller 20 controls the movement of carriage 14 and media transport 16. Controller 20 is electrically connected to printhead 24 to selectively energize the firing resistors to eject ink drops on to media 26 in a macro print zone. By coordinating the relative position of cartridge 12 and printhead 24 with media 26 and the ejection of ink drops, controller 20 produces the desired image on media 26. Controller 20 is electrically connected to laser writer 28 to selective energize the laser diode or other laser light source in optical head 30 to expose media 26 to a laser beam in a micro print zone, thus altering the reflectivity of media 26. By coordinating the relative position of optical head 30 with media 26 when the laser diode is energized, controller 20 produces the desired micro markings on media 26. Although the macro print zone and the micro print zone are substantially coextensive with one another in the embodiments described below, the two print zones may be distinct from one another. The micro print zone, for example, may be located downstream along the media path from the macro print zone.

Figure 2:
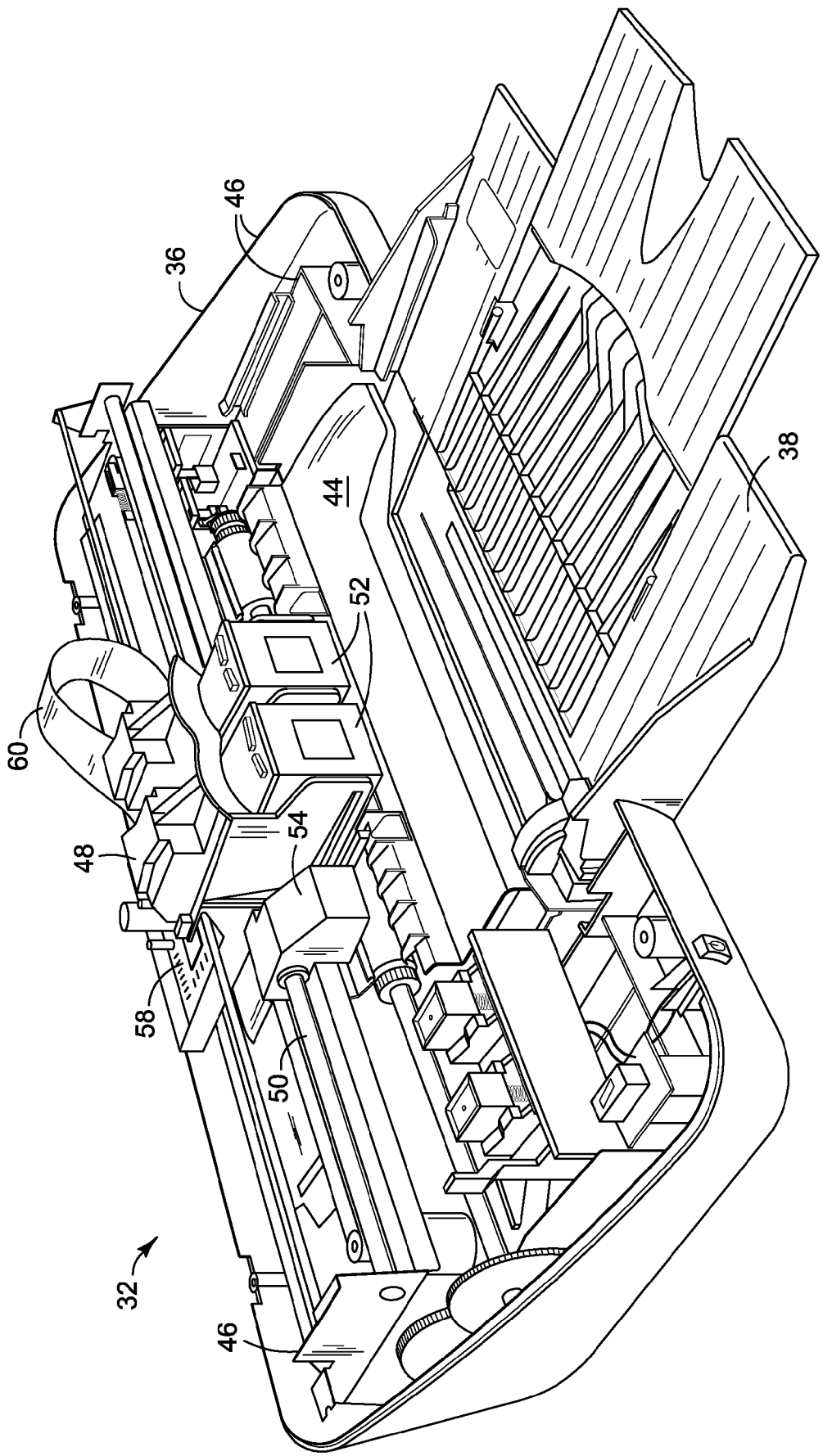
FIG. 2 is a perspective view illustrating an inkjet printer with a laser writer such as the printer shown in the block diagram of FIG. 1, according to one embodiment of the invention.
Figure 3:
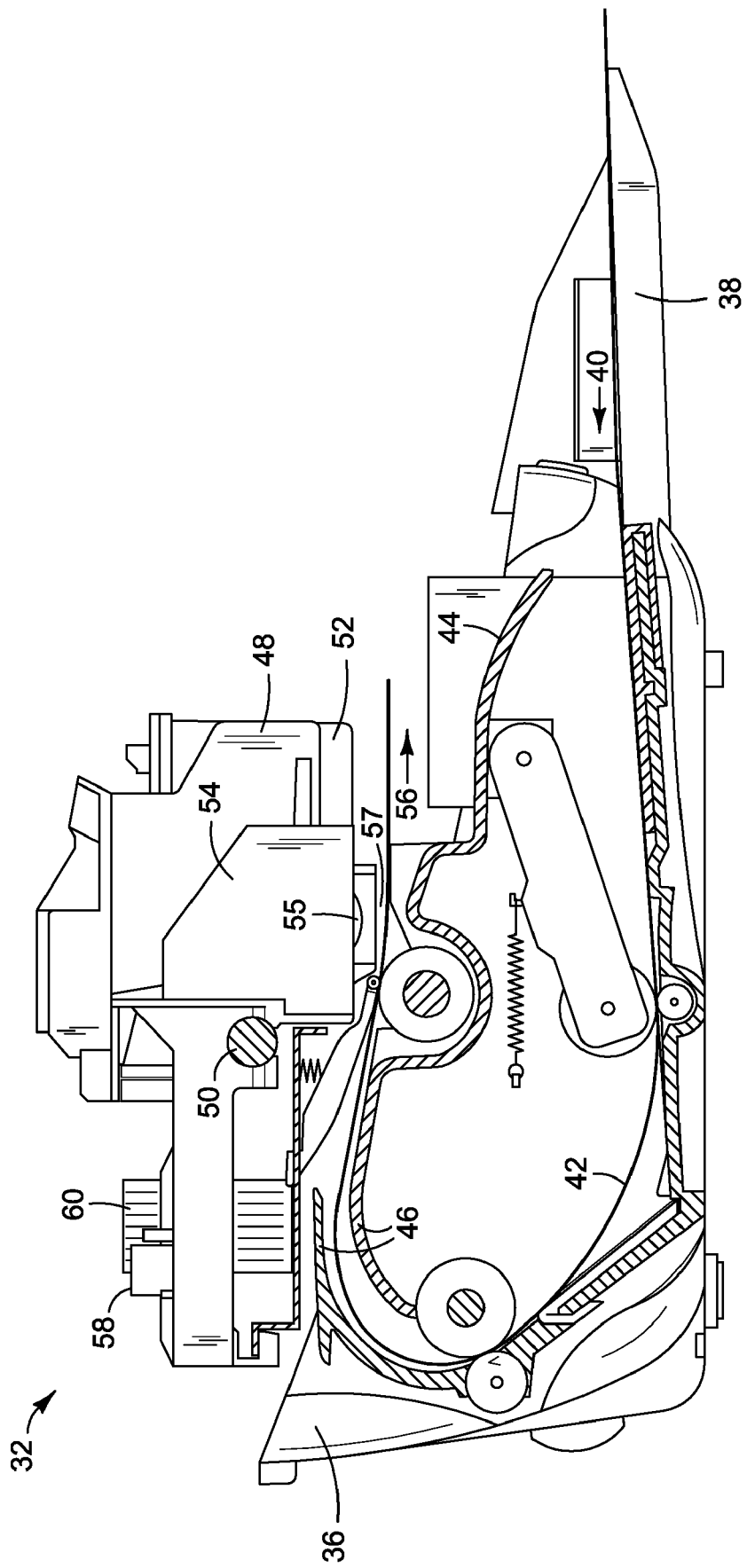
FIG. 3 is an elevation and partial section view of the printer of FIG. 2.

FIGS. 2 and 3 are perspective and side elevation views, respectively, of an inkjet printer 32, such as printer 10 shown in the block diagram of FIG. 1. Printer 32 includes a cover (not shown) and a housing 36. The cover is removed in FIGS. 2-3 to expose the operative components of printer 32. A sheet media tray 38 is positioned at the bottom of printer 32 along an opening 40 in housing 36. Paper or other print media sheets 42 are stacked in tray 38 for input to printer 32 and printed sheets are output back through opening 40 over tray 38. A supporting surface 44 helps suspend the trailing edge of the printed sheets over tray 38. Printer 32 includes a chassis 46 that supports the operative components of printer 32. Chassis 46 represents generally those parts of housing 36 along with other structurally stable elements in printer 32 that support the operative components of printer 32. A carriage 48 is driven back and forth along a guide rail 50 mounted to chassis 46. Any suitable drive mechanism may be used to move carriage 48. A reversing motor (not shown) coupled to carriage 48 through a belt and pulley system (not shown), for example, is one carriage drive mechanism commonly used in inkjet printers.

Ink cartridges 52 and a laser writer 54 are mounted on carriage 48. As best seen in FIG. 3, cartridges 52 and laser writer 54 are positioned along a media path 56 such that each sheet of print media 42 passes directly under cartridges 52 and laser writer 54 at a print zone 57. As described above, the bottom of each cartridge 52, which faces media sheet 42, includes an array of nozzles through which drops of ink are ejected onto media sheet 42. The objective lens in the optical head 55 (FIG. 3) of laser writer 54 also faces down so that a laser beam may be projected down on to media sheet 42 as it passes through print zone 57.

An electronic printer controller 58 receives print data from a computer, scanner, digital camera or other image generating device. Also, controller 58 may itself generate print data, as well as store pre-programmed print data. For example, an inkjet printer 32 that will be used for micro printing security markings on a document, for example, may be preprogrammed with the data and logic to macro print a security patch with cartridges 52 at a predetermined location on the document and then micro print a security code on the patch with laser writer 54. Of course, the macro and micro printing data might also be received from an external source running the security marking logic.

Controller 58 controls the movement of carriage 48 back and forth across media sheet 42 and the advance of media sheet 42 along media path 56. Printer controller 58 is also electrically connected to ink cartridges 52 and laser writer 54 through, for example, a flexible ribbon cable 60. For macro printing, as carriage 48 carries cartridges 52 across media sheet 42, printer controller 58 selectively activates ink ejection elements in cartridges 52 according to macro print data to eject ink drops through the nozzles onto media sheet 42. By combining the movement of carriage 48 across media sheet 42 with the movement of sheet 42 along media path 56, controller 58 causes cartridges 52 to eject ink onto media sheet 42 to form the desired print image. For micro printing, as carriage 48 moves laser writer 54 across media sheet 42, controller 58 selectively energizes a laser diode or other laser light source to mark media sheet 42. By coordinating the relative position of laser writer 54 with media sheet 42 when the laser diode is energized, controller 58 produces the desired micro image on media sheet 42.

Micro Marking Print Media

Figure 4:
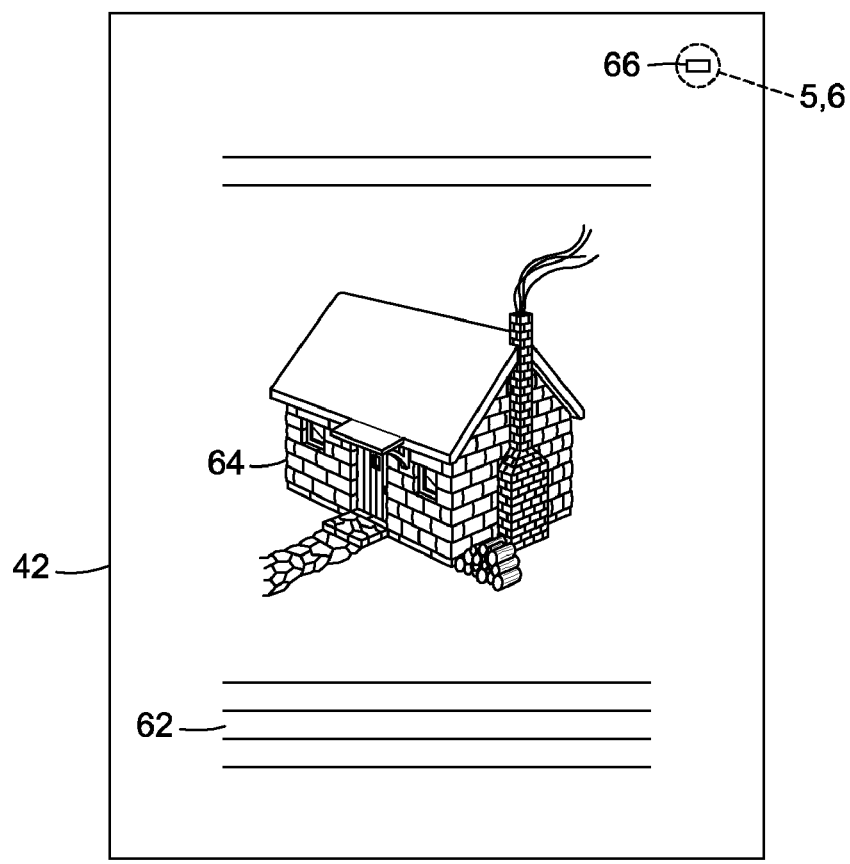
FIG. 4 illustrates a sheet of paper or other print media printed with conventional text and images along with a microprint security marking according to one embodiment of the invention.
Figures 5, 6:
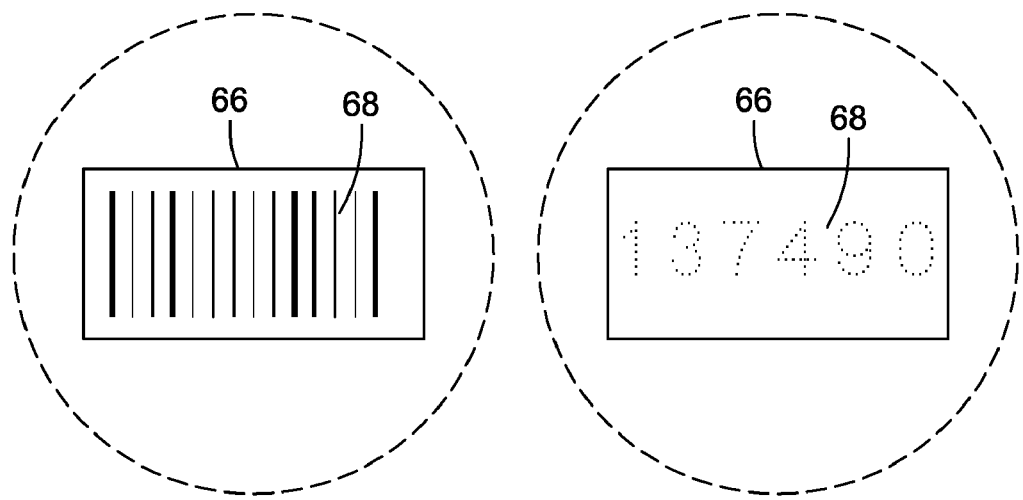
FIGS. 5 and 6 are detailed views of the security marking on the sheet illustrated in FIG. 4 showing two different types of microprint data.

FIG. 4 illustrates a sheet of paper 42 or other print media with conventional macro print text 62 and images 64 along with micro print markings on a small ink patch 66. FIGS. 5 and 6 are detail views of patch 66 showing two different types of micro print markings 68 printed on patch 66. In FIG. 5, micro markings 68 form a bar code. In FIG. 6, micro markings 68 form a sequence of numbers. In the embodiment shown in FIGS. 4-6, micro markings 68 are formed on an ink patch 66 that is printed on an individual sheet 42 along with text 62 and images 64. That is to say, ink patch 66 is not pre-printed on sheet 42. In one such embodiment, the ink used to print patch 66 includes a laser absorbing dye that facilitates the micro marking process. Laser absorbing dyes generate heat when they absorb light. Such dyes may be (and often are) specially formulated to absorb predetermined wavelengths of laser light to produce the desired heating effect. Depending on the type of dye, the wavelength of the light beam emitted by the laser, the intensity of the laser beam, and the duration that the dye is exposed to the laser beam, the marking effect may result in, for example: chemical degradation and discoloration of the laser absorbing dye; chemical degradation and discoloration of other visible colorants in the ink through heat generated by the laser absorbing dye; chemical degradation and discoloration of the substrate/print medium through heat generated by the laser absorbing dye (charring a paper print medium, for example); and physical removal of the substrate/print medium through heat generated by the laser absorbing dye. This effect changes the reflectivity of the print medium, and these changes may be detected by a laser reader in much the same way that a CD (compact disk) player reads the changes in the reflectivity of the surface of a CD.

Integrating a laser writer with an inkjet printer, as described above, gives the user a high degree of flexibility in generating documents with micro print markings. Micro print markings 68 may be formed on sheet 42 along with macro print markings (text 62, images 64 and/or patch 66) on the same pass through printer 32 by, for example, writing the micro print markings immediately after each swath of ink is applied at the desired locations. Thus, a complete document may be generated on one pass through the printer. Alternatively, the micro print markings may be written on a distinct pass through the printer dedicated solely to micro printing which, of course, will be required in the case of micro printing on form documents. This same flexibility may be realized by integrating a laser writer with other digital printers including, for example, some types of liquid electrophotograhic printers (LEPs) and direct electrostatic printers (DEPs). In addition, integrating the laser writer with a digital printer allows the user to macro print and micro print completely different content on sequential pages. (Unlike offset printers and other analog printers, a digital printer is capable of printing completely different content on sequential pages.)

Many types of higher quality, so-called photographic printing paper, belong to the class of swellable media in which ink colorants are retained by their preferential absorption into an ink receiving layer. The ink receiving layer includes water soluble or water swellable polymeric species. Some conventional inkjet colorants act as laser absorbing dyes. Ejecting or otherwise applying these colorants to the ink receiving layer of a swellable media makes the paper laser absorbing too. Laser marking the media is improved if the wavelength of the writing laser matches the extinction peaks of the inkjet colorants. The colorant/dye in the media absorbs the light and generates heat. The heat burns the polymers. For example the laser beam burns a pit into the ink receiving layer of the paper (or other media) and the resulting three dimensional surface topography creates a pattern of changing reflectivity that may be sensed by a reading laser. A more smooth print media, glossy photographic printing paper for example, is desirable since reading the marking depends on detecting the pits burned in the surface of the media.

Instead of (or in addition to) pitting the paper to create the micro marks, the laser writer may be used to change the color of the paper (or other print media). Inkjet colorants/dyes used in printing the micro marks may be altered, for example, by photo bleaching the dye through exposure to shorter wavelength laser beam of light (e.g., about 400 nm) and/or thermally decomposing the dye. Dyes with strong extinction peaks in longer wavelengths are preferred because they tend to convert more of the absorbed light energy into heat. The print media need not be as smooth for this color change technique as for the pitting technique because the reflectivity changes are sensed from color differences, not from surface topography. In other words, the color change technique will work with rough as well as smooth media. Of course, the degree of thermal decomposition of the colorant may vary from color change to charring to pitting depending on the characteristics of the dye/colorant, the wavelength of the beam of light emitted by the laser, the intensity of the laser beam, and the duration that the dye is exposed to the laser beam.

Suitable laser absorbing dyes include, for example, acid Yellow 9 (disodium 4-aminoazobenzene-3,4'-disulfonate) available from Aldrich and other suppliers, acid Yellow 17 (benzenesulfonic acid, 2,5-dichloro-4-[4,5-dihydro-3-methyl-5-oxo-4-[(4-sulfophenyl)azo]-1H-pyrazol-1-yl]-, disodium salt (9CI)) and acid Yellow 23 (3-Carboxy-5-hydroxy-1-p-sulfophenyl-4-p-sulfophenylazopyrazole trisodium salt) available from TCI Organic Chemicals and other suppliers, and Y1189 (chemical structure not available) available from ILFORD Imaging. Inkjet printing receptive type photo printing paper on which the Y1189 yellow dye had been applied turns dark at the point of exposure to a 400 nm laser light applied as a 2.5 μm FWHM (Full Width Half Maximum) Gaussian irradiance profile beam for 3 μsec. Inkjet printing receptive type photo printing paper to which the Y1189 yellow dye has been applied pits at the point of exposure to a 784 nm wavelength laser light applied as a 6 μm FWHM (Full Width Half Maximum) Gaussian irradiance profile beam for 30 μsec.

A laser absorbing dye jetted on or otherwise applied to paper or other print media diffuses into the top layer of the paper. A laser beam projected on to the surface of the paper is absorbed by the dye, causing localized heating which decomposes or pits the paper. A pattern of such decomposition/pit marks is optically readable as changes in surface reflectivity. A stronger read signal may be obtained by adding a highly reflective "mirror" layer below the laser absorbing dye layer on the print media. A comparatively deep pit (i.e., a hole) in the dye layer reveals the mirror layer, creating a more distinct pattern of reflectivity and a corresponding stronger read signal. A layer of polymer may be jetted on or otherwise applied to the paper, and then cured, to provide a more smooth under layer, if desired, on which the mirror layer may be formed. The polymer under layer should have good adhesion to the paper, be smooth in order to get a consistent reflection from the mirror layer, and be durable enough so that it does not deform over time or during laser marking. A low molecular weight UV curable acrylate, for example, provides a suitable polymer. The polymer, dissolved in isopropyl alcohol or another suitable solvent, may be jetted on to the paper using an inkjet printer such as the printer described above.

Figure 7:
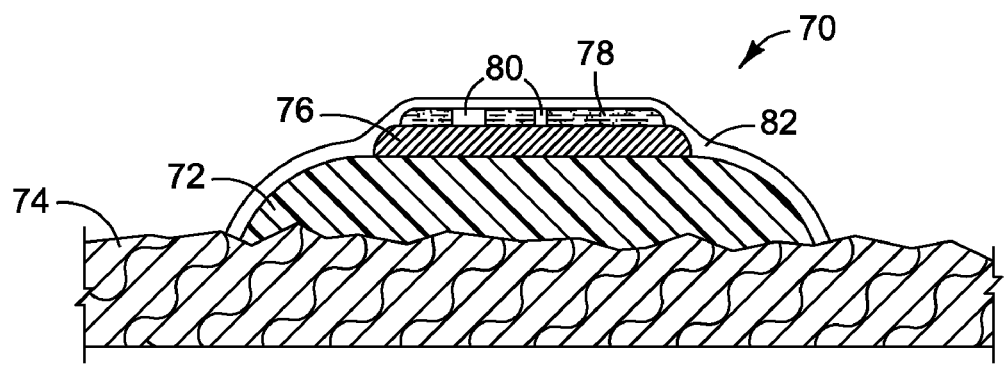
FIG. 7 illustrates a layered micro printing patch according to one embodiment of the invention.

FIG. 7 illustrates a multi-layered micro printing patch 70 (such as patch 66 from FIGS. 3-6) that includes a polymer under layer 72 formed on paper 74 and a reflective mirror layer 76. In one embodiment, mirror layer 76 is formed by jetting silver nano particles on to polymer 72 as part of an ink solution that includes a stabilized suspension of the silver particles. The laser absorbing dye 78 is then jetted on to the silver mirror layer 76 and marked with a laser writer as described above. The micro print markings are shown as holes 80 burned through dye layer 78. If desired, a protective cover layer 82 encapsulating the underlying structure may be applied as part of patch 70. Cover layer 82 may be applied before or after the formation of markings 80. Each of these layers may be applied using an inkjet printer, such as printer 10 and printer 32 shown in FIGS. 1-3. In one exemplary configuration for micro printing a built-up patch 70, mirror layer 76 is about 0.5 μm thick, dye layer 78 is about 150 nm thick, micro markings 80 are about 0.4 μm in diameter, and cover layer 82 is not more than about 5 μm thick. A human normally can not visually register marks that are smaller than about 10 μm in size. A high performance scanner with a resolution of 2400 dpi (dots per inch) also cannot resolve a mark that is smaller than about 10 μm in size. Consequently, marks substantially smaller than 10 μm in size (3 μm marks and smaller, for example) are not visible to the naked eye and difficult or impossible to scan.

MFP with Laser Writer and Laser Reader

Figure 8:
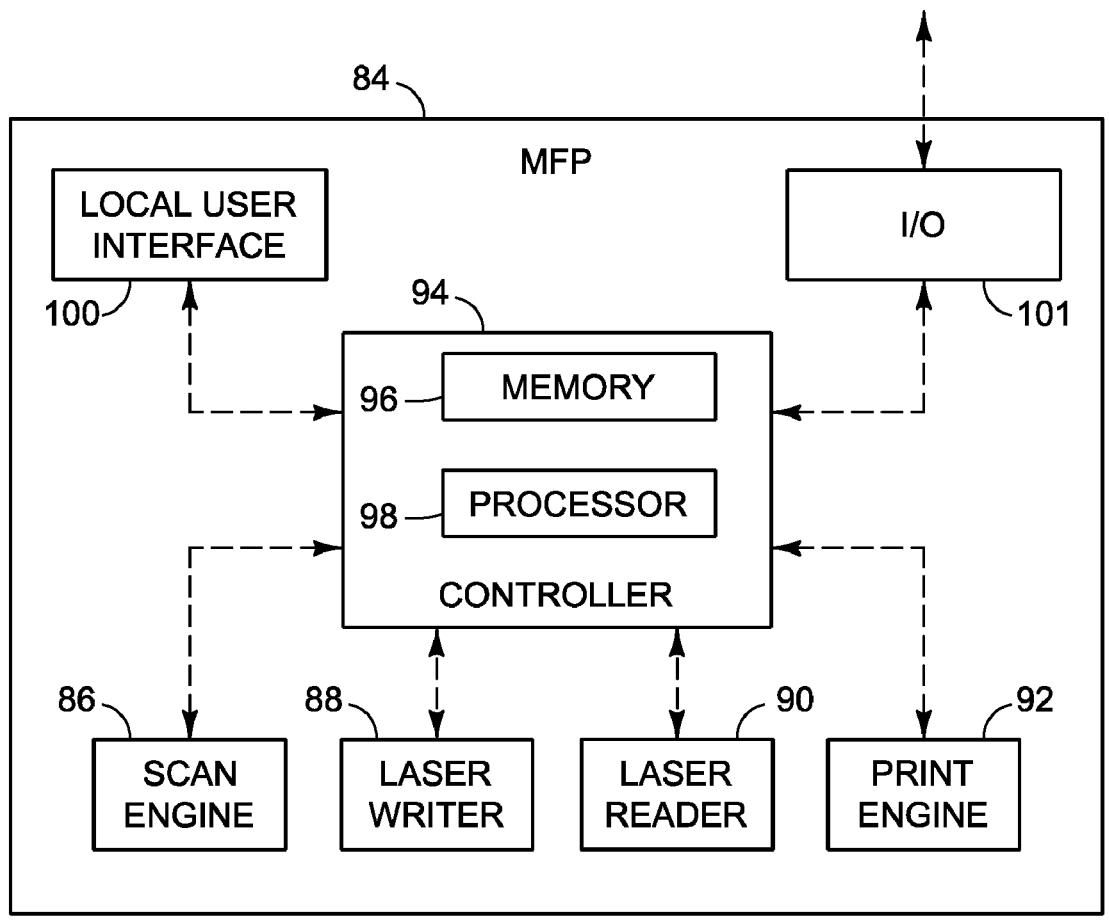
FIG. 8 is a block diagram illustrating a multi-function printer (MFP) that includes a laser writer and a laser reader, according to one embodiment of the invention.

The block diagram of FIG. 8 illustrates a multi-function printer (MFP) 84 that includes a scan engine 86, a laser writer 88, a laser reader 90 and a print engine 92 operating under the control of an electronic controller 94. Controller 94 includes a memory 96 and a processor 98. Memory 96 may include a so-called "hard drive", read only memory (ROM), and random access memory (RAM) for storing data and programming associated with all aspects of MFP 84. MFP 84 also includes a local user interface 100 and an input/output device 101 that allows MFP 84 to communicate with host computers or other external devices. While only a single controller 94 is shown, controller 94 may have constituent parts physically and/or logically associated with each of the scan engine 86, laser writer 88, laser reader 90 and print engine 92.

Scan engine 86 represents generally well known structural and operational components for performing the scan function of MFP 84. Print engine 92 represents generally well known structural and operational components for performing the print function of MFP 84. Laser writer 88 represents generally any suitable laser and related optics for marking paper or other print media, as described above. Laser reader 90 represents generally any suitable laser and related optics for reading the patterns of reflectivity created by micro printing marks written by laser writer 88 or otherwise formed on a document. The optical pickup unit from a Hitachi Lucky-Goldstar optical disk drive model HLDS GCC-4241 N, for example, may be adapted for use as a laser reader 90.

Figure 9:
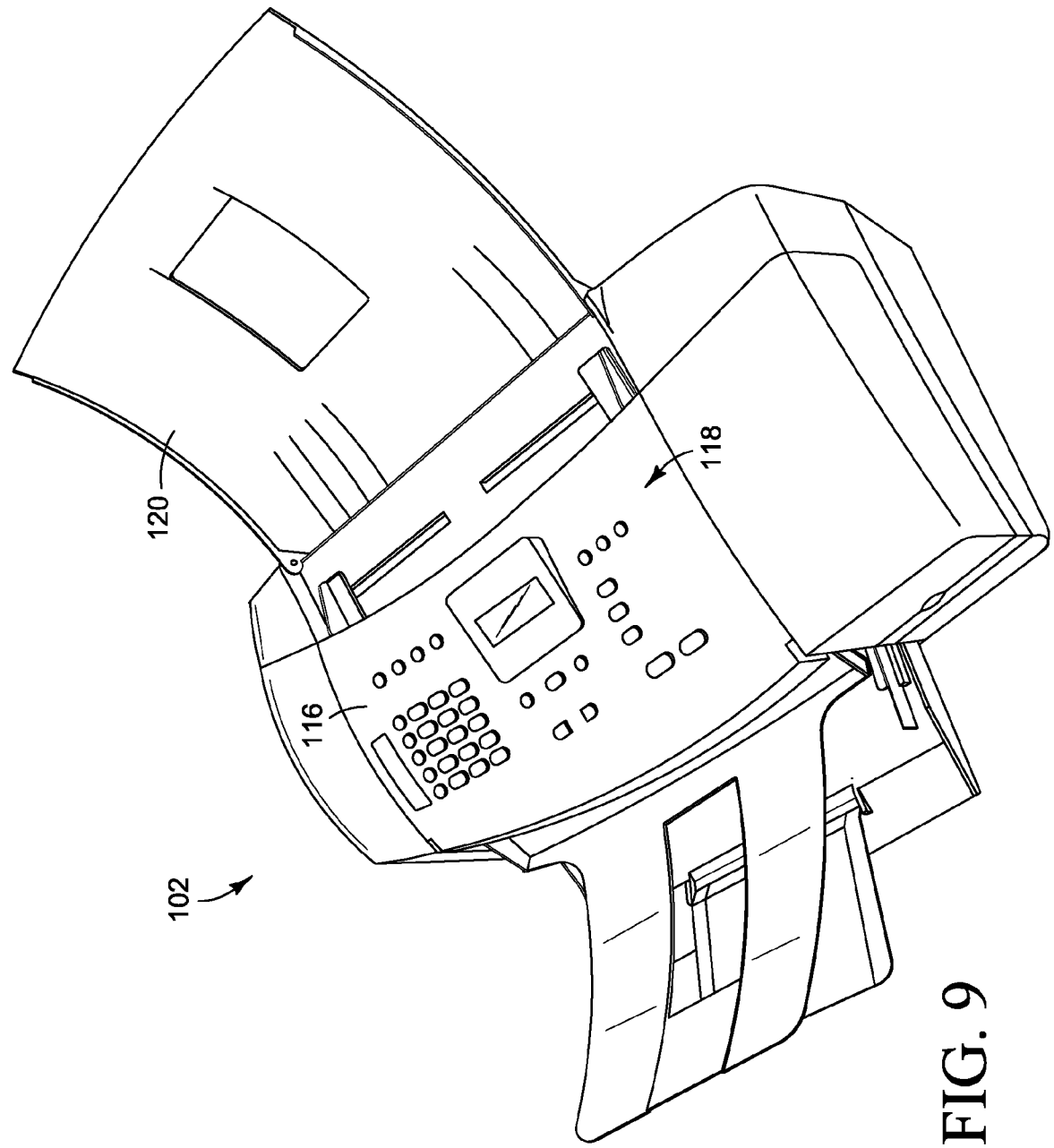
FIGS. 9 and 10 are perspective views illustrating an inkjet multi-function (MFP) with a sheet feed scanner and including a laser writer and a laser reader such as the MFP shown in the block diagram of FIG. 8, according to one embodiment of the invention. The top access panel is closed in FIG. 9 and open in FIG. 10.
Figure 10:
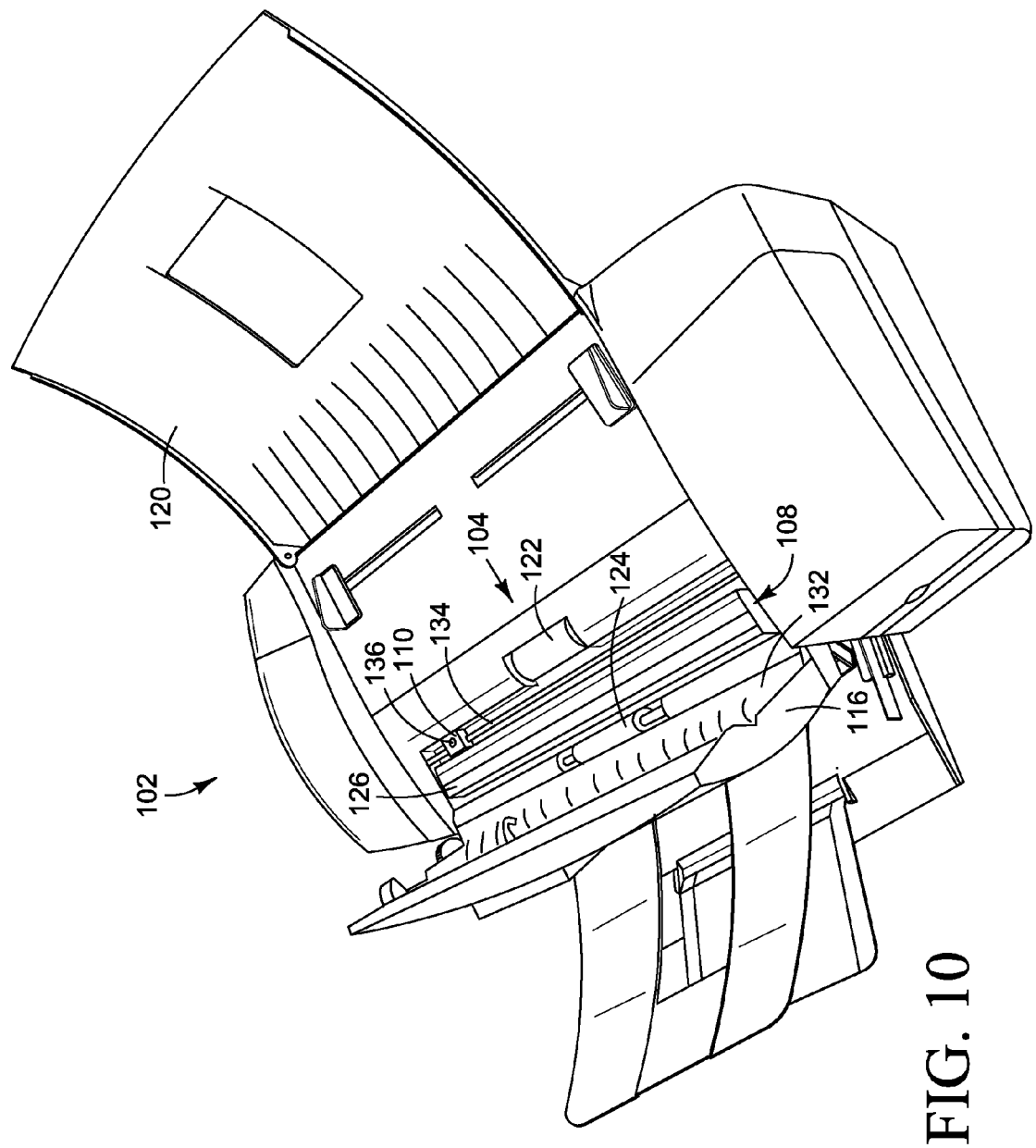
Figure 11:
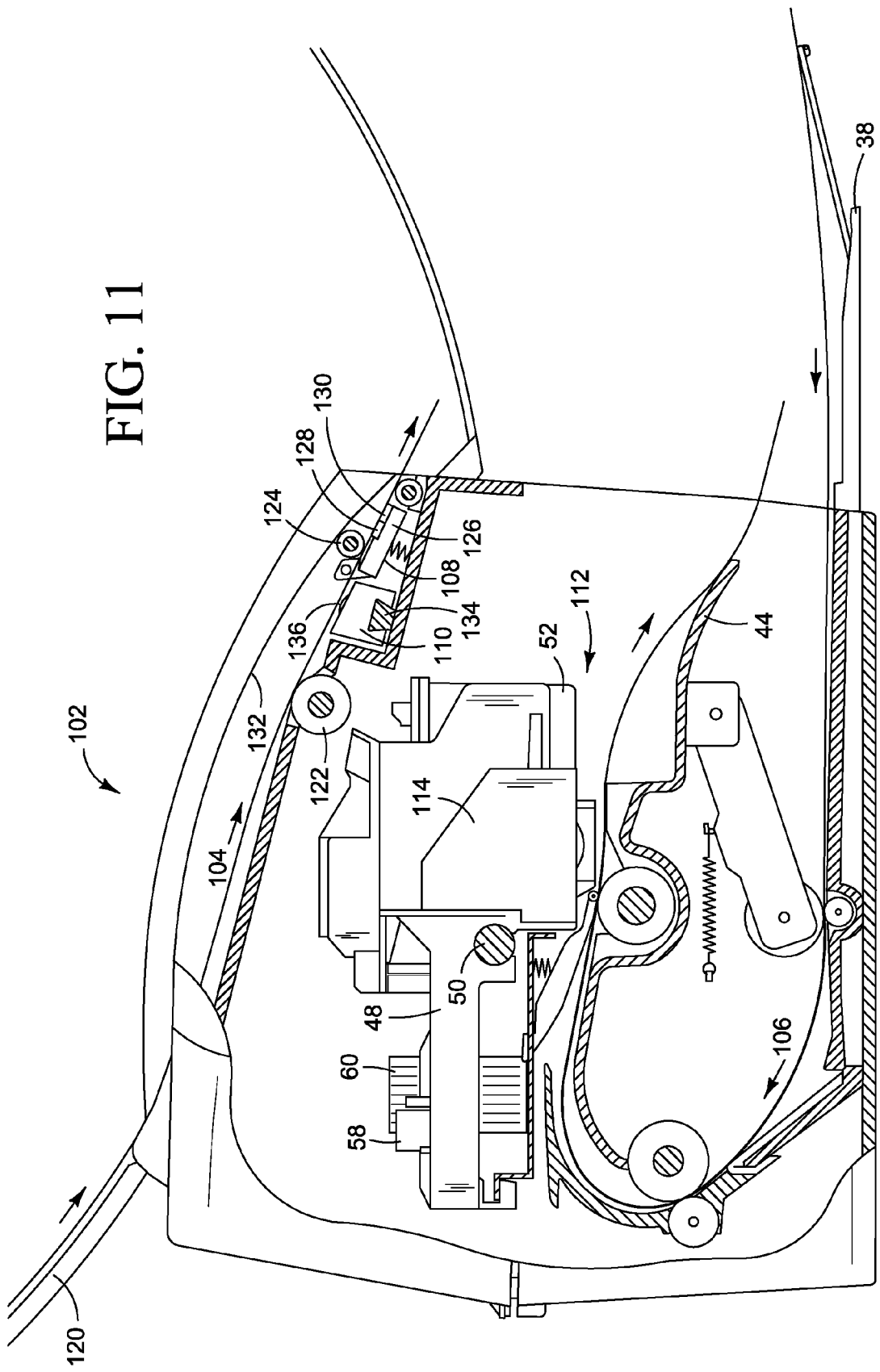
FIG. 11 is an elevation and partial section view of the MFP shown in FIG. 10.
Figure 12:
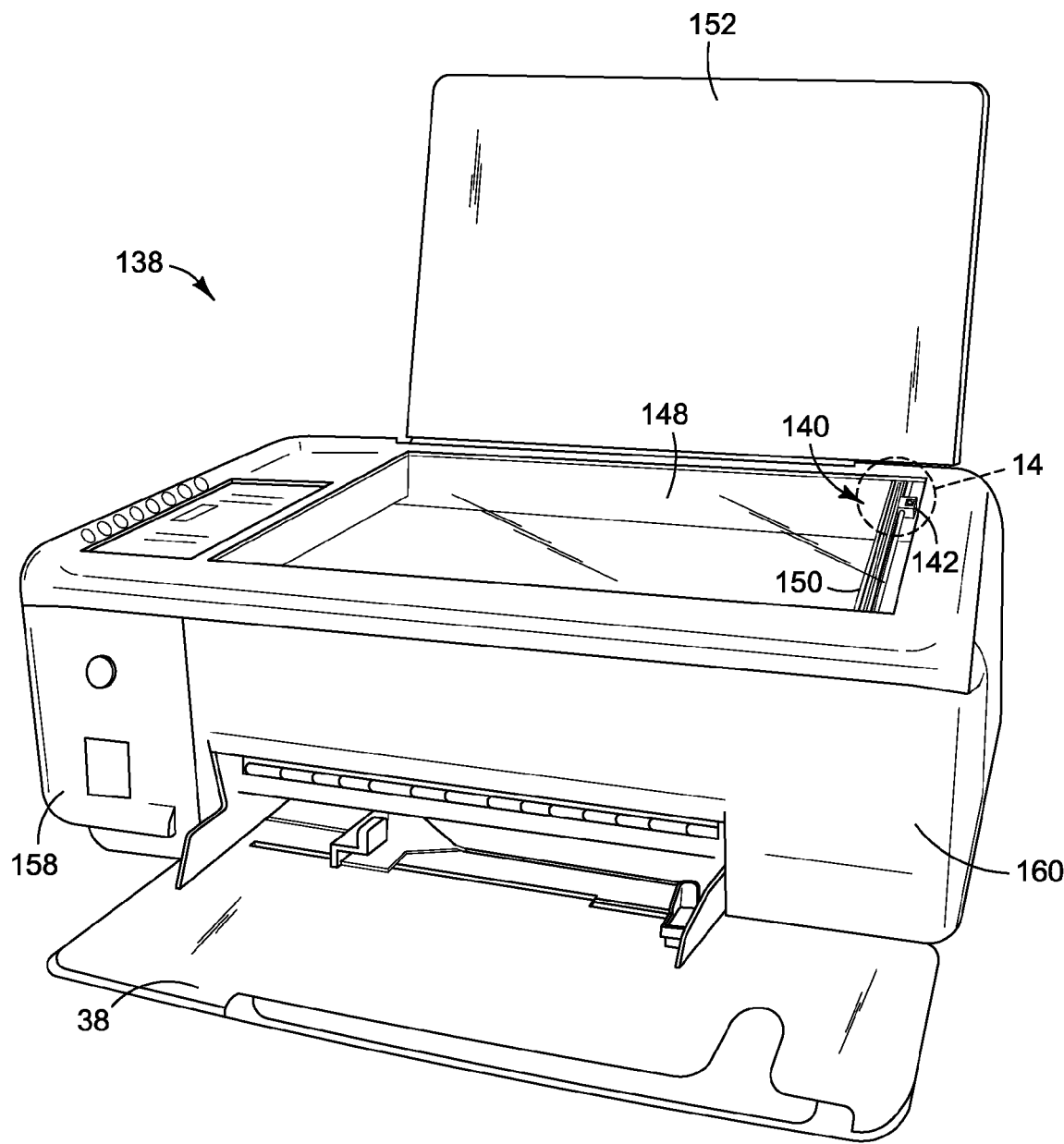
FIGS. 12 and 13 are perspective views illustrating an inkjet multi-function (MFP) with a flat bed scanner and including a laser writer and a laser reader such as the MFP shown in the block diagram of FIG. 9, according to one embodiment of the invention. The front access door is closed in FIG. 12 and open in FIG. 13.
Figure 13:
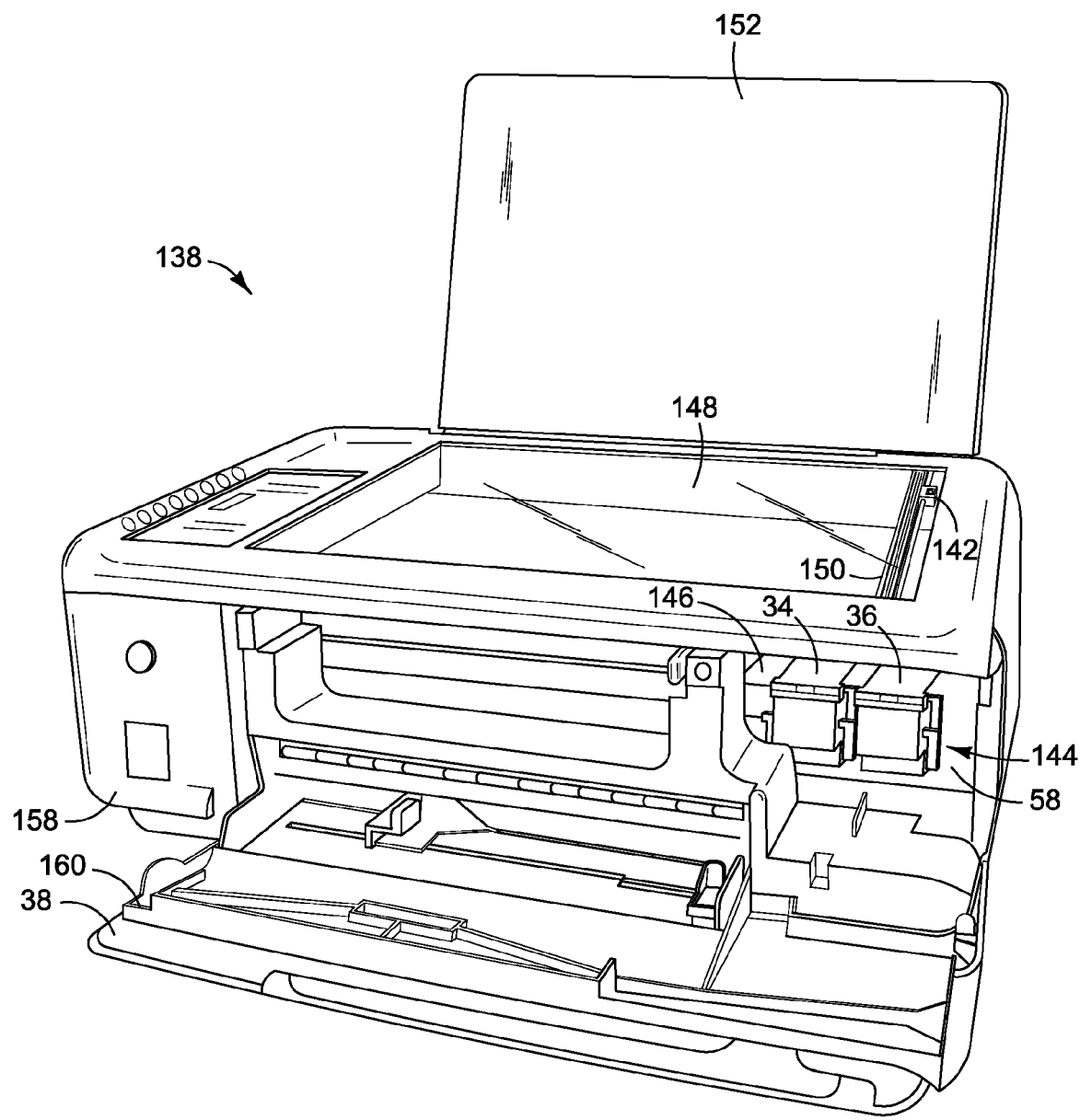
Figure 14:
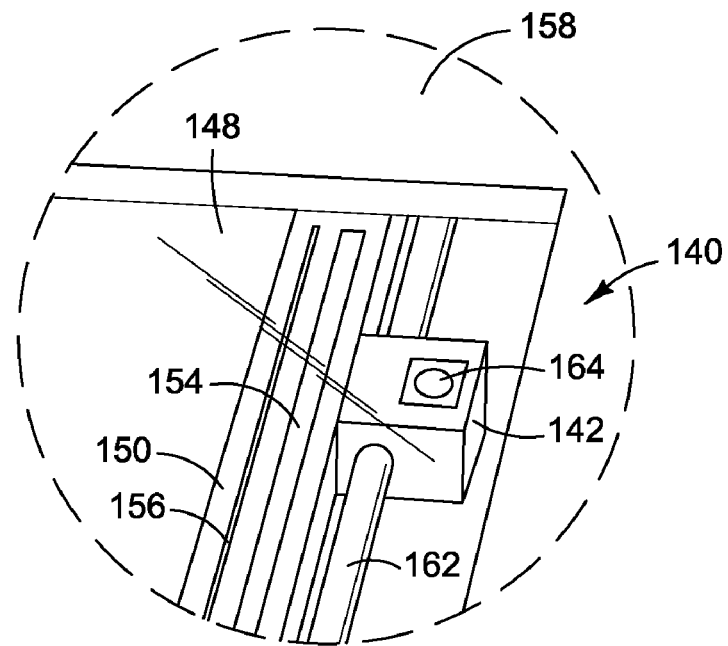
FIG. 14 is a detailed view of the laser read head in the MFP of FIGS. 12 and 13.

FIGS. 9-11 illustrate an inkjet MFP 102 that includes a sheet fed scanner. An inkjet printing, sheet fed scanning MFP 102 is one example of a MFP 84 shown in the block diagram of FIG. 8. FIGS. 12-14 illustrate an inkjet MFP 138 that includes a flat bed scanner. An inkjet printing, flat bed scanning MFP 138 is another example of a MFP 84 shown in the block diagram of FIG. 8.

Referring first to FIGS. 9-11, MFP 102 includes a media scan path 104 and a media print path 106 (FIG. 11). A document is exposed to a scan engine 108 and a laser reader 110 along scan path 104. Print media is exposed to a print engine 112 and a laser writer 114 along print path 106. The components of print engine 112 and laser writer 114 in MFP 102 are the same as the printer and laser writer components shown in FIGS. 2-3 and described above for printer 32.

As best seen by comparing FIGS. 9 and 10, an access panel 116 across the top of MFP 102 opens to expose scan path 104 and components of scan engine 108 and laser reader 110. As shown in FIG. 9, access panel 116 carries the local user interface 118 for MFP 102. In a typical scanning operation, a document or other scan target placed in a scan input tray 120 is fed along scan path 104 at the urging of a feed roller 122 and output rollers 124. A stationary scan bar 126 spans the full width of scan path 104. Scan bar 126 includes a lamp 128 and a light sensitive detector 130. As the document moves along scan path 104 past scan bar 126, light reflected back from the document is sensed by detector 130. A charge-coupled device (CCD) is one example of a light sensitive detector 130 commonly used in scanners for detecting the optical image of the target and converting it into a digital electronic image. A white or other reflective scan target backer 132 (FIG. 10) attached to or integrated with the inside of access panel 116 provides a uniform background to the scan target.

Laser reader 110 is mounted on a carriage rail 134. The focusing lens in the optical head 136 (FIG. 11) of laser reader 110 faces up so that the laser beam may be projected up on to a document as it moves along scan path 104. Controller 58 controls the movement of laser reader 110 back and forth across scan path 104 and the advance of a document along scan path 104. For reading micro print markings on a document, controller 58 energizes a laser diode or other laser source in reader 110 as reader 110 scans across the desired area of the document as the document moves along scan path 104. For example, the micro printing patch 70 on sheet 42 in FIG. 4 may be read by moving laser reader 110 to the position of patch 70 and energizing the laser diode as reader 110 is scanned back and forth on rail 134 across patch 70 and as the document moves along scan path 104. By coordinating the relative position of laser reader 110 with the position of the document along scan path 104 when the laser diode is energized, controller 58 allows laser reader 110 to sense/read the micro printing marks on patch 70.

Referring now to FIGS. 12-14, a flatbed scanning inkjet MFP 138 includes a scan engine 140, a laser reader 142, a print engine 144 and a laser writer 146. The components of print engine 144 and laser writer 144 in MFP 138 are the same as the printer and laser writer components shown in FIGS. 2-3 and described above. In a flat bed scanning device like MFP 138, scan engine 140 includes, for example, a scan glass 148, a scan head 150 (including the lamp and light detector) and a motorized carriage (not shown) that carries scan head 150 back and forth under scan glass 148 at the direction of the controller (not shown).

MFP 138 includes a cover 152 that opens and closes to expose glass 148 as may be necessary or desirable for a particular scanning operation. In a typical scanning operation, a document or other scan target on glass 148 is illuminated by a lamp 154 on scan head 150. As scan head 150 moves across the target, light reflected from the target passes through a narrow slot 156 in scan head 150 to a light sensitive detector. The light is typically focused on the detector and otherwise manipulated by mirrors and lenses within scan head 150. A charge-coupled device (CCD) array is one example of a light sensitive detector used in many scanners for detecting the optical image of the target and converting it into a digital electronic image. The operational components of MFP 138 are enclosed in and generally supported by a housing 158. As best seen by comparing FIGS. 12 and 13, an access door 160 at the front of housing 158 drops down to expose part of print engine 144, including ink cartridges 52 and print zone 57.

Laser reader 142 is mounted to a carriage rail 162 on scan head 150. The focusing lens in the optical head 164 (FIG. 14) of laser reader 142 faces up so that the laser beam may be projected on to a document positioned on scan glass 148. The controller controls the movement of laser reader 142 back and forth across scan glass 148 with the advance of scan head 150 along scan glass 148. For reading micro print markings on a document, the controller energizes a laser diode or other laser source in reader 142 as reader 142 scans across the desired area on the document and scan head 150 moves along scan glass 148. For example, the micro printing patch 70 on the document shown in FIG. 4 may be read by moving laser reader 142 to the position of patch 70 and energizing the laser diode as reader 142 is scanned back and forth on rail 162 across patch 70 and scan head 150 moves along scan glass 148. By coordinating the relative position of laser reader 142 along rail 162 and scan head 150 when the laser diode is energized, the controller allows laser reader 142 to sense/read the micro printing marks on patch 70.

Figure 15:
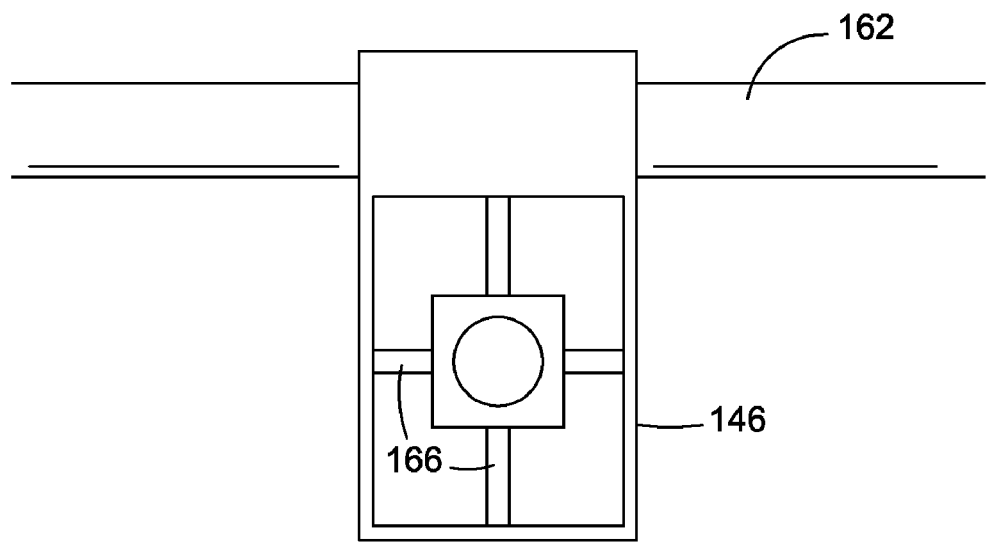
FIG. 15 illustrates a rail mounted laser writer with local x-y positioning for the writer's optical head.

While it is expected that the printer carriage and media transport mechanisms will be adequate to properly locate the micro marks for many micro printing applications, the laser writer or the laser reader (or both) may itself include a one or two dimensional positioning mechanism to achieve the desirable degree of precision in writing micro marks or in reading micro marks. For example, a laser writer 146, shown in FIG. 15, may itself include a mechanism for positioning the laser diode/optical head more precisely as may be necessary or desirable for a particular micro printing operation. One such x-y positioning mechanism 166 is illustrated generally in FIG. 15.

The present invention has been shown and described with reference to the foregoing exemplary embodiments. Other embodiments are possible. For example, for MFPs in which the print path and the scan path are the same, the laser writer and laser reader may be incorporated into one device, much like a CD burner which includes a read laser and a more powerful write laser in the same unit. It is to be understood, therefore, that other forms, details and embodiments may be made without departing from the spirit and scope of the invention which is defined in the following claims.

What is claimed is:

1. A printing device, comprising:
   a print engine configured to apply marking material to print media;
   a laser writer configured to expose the print media to a laser beam of sufficient energy to form a pit in the print media or a material disposed thereon so as to change the reflectivity of exposed portions of the print media;
   a media path along which the print engine may apply marking material to print media in a macro printing zone and along which the print media may be exposed to a beam of light emitted by the laser writer in a micro printing zone; and
   an electronic controller operatively connected to the print engine for selectively applying marking material to the print media and to the laser writer for selectively exposing the print media to a laser beam such that a number of said pits are made according to a desired image.

2. The device of claim 1, wherein the macro printing zone and the micro printing zone are substantially coextensive with one another.

3. The device of claim 1, wherein
   the marking material comprises a marking material that includes a laser absorbing dye and the electronic controller operatively connected to the print engine for selectively applying marking material to the print media and to the laser writer for selectively exposing the print media to a laser beam comprises an electronic controller operatively connected to:
   the print engine for selectively applying marking material to the print media at a micro print location; and
   the laser writer for selectively exposing, to a laser beam, marking material on the print media at the micro print location.

4. The device of claim 1, further comprising a movable carriage carrying the laser writer and wherein the electronic controller is operatively connected to the carriage for selectively moving the laser writer across the media path.

5. The device of claim 1, wherein the print engine comprises an inkjet print engine that includes a print cartridge and the printer further comprising a movable carriage carrying the print cartridge and the laser writer, the electronic controller operatively connected to the carriage for selectively moving the print cartridge and the laser writer across the media path.

6. The device of claim 1, wherein a wavelength of the laser beam of said laser writer matches extinction peaks of inkjet colorants ejected as said marking material by said print engine.

7. The device of claim 1, further comprising an optical pickup for optically reading said desired image formed by said pits.

8. The device of claim 1, wherein the print engine comprises a material jetting device for jetting a reflective layer on the print media and a covering layer over the reflective layer to form the micro printing zone, wherein the laser writer is configured to pit holes in the covering layer to selectively expose the underlying reflective layer.

9. The device of claim 8, wherein the covering layer is a layer of said marking material.

10. The device of claim 8, wherein the material jetting device is further configured for jetting a polymer layer on the print media over which the reflective layer is applied.

11. The device of claim 8, wherein the material jetting device is further configured to apply a protective cover layer over the covering layer and reflective layer.

* * * * *